May 15, 1951 W. J. BRIDGE 2,553,034
SUCTION SQUEEGEE
Filed Nov. 15, 1945 2 Sheets-Sheet 1

Inventor
W. J. Bridge
By Glascock Downing Seebold
Attys.

May 15, 1951  W. J. BRIDGE  2,553,034
SUCTION SQUEEGEE

Filed Nov. 15, 1945  2 Sheets-Sheet 2

Inventor
W. J. Bridge
By Glascock Downing Seebold
Attys.

Patented May 15, 1951

2,553,034

UNITED STATES PATENT OFFICE 2,553,034

SUCTION SQUEEGEE

William James Bridge, Wembley, England, assignor to R. G. Dixon & Company Limited, Wembley, England Application November 15, 1945, Serial No. 628,880
In Great Britain June 20, 1944

Section 1, Public Law 690, August 8, 1946
Patent expires June 20, 1964

4 Claims. (Cl. 15—369)

This invention relates to suction squeegees such as are used to remove surface water from floors or other surfaces, for instance after scrubbing or hosing.

In the specification of my prior British specification No. 541,142 I have described and claimed an apparatus for the purpose referred to comprising a framework or support carrying a tank and a motor-operated suction pump delivering into said tank, the frame being carried upon wheels adapted to take the load off the operator and arranged behind a nozzle connected to the suction pump and extending transversely of the frame and adapted to contact with the floor or other surface.

The object of the present invention is to devise improvements in the construction and arrangement of such squeegees, and the invention consists in arranging for the device to be operative at will in either forward or rearward direction of travel, by providing two nozzles (one for each direction of movement) and means acting automatically to close the nozzle not for the time being in use according to the particular direction of travel chosen.

The invention also consists in other details and arrangements hereinafter described or indicated.

The accompanying drawings illustrate one convenient form of apparatus in accordance with the invention.

In carrying my invention into effect in one convenient manner, I form my improved apparatus as to the framework $a$, motor-driven pump $b$, and tank $c$ much in the manner described in the before-mentioned specification, except that I prefer to arrange the tank between the nozzle and the pump so that the latter has to handle air only, the water being delivered to the tank by the suction created. Moreover, I provide a two-way valve $d$ in the pipe line such that in one position it may be employed for producing a vacuum in the tank while in the other position the operation of the pump will build up pressure within the tank so that the liquid can be discharged therefrom, suitably into any available drain, through the outlet pipe $e$ which extends to near the bottom of the tank and which may conveniently be formed of a piece of flexible hose secured to a non-return valve in the upper part of the tank and depending into the tank, the non-return valve (not shown) being connected to discharge nozzle $n$. If desired, I may fit in the pipe line two adaptors $d^1$ $d^2$ one of which may take a hose with interceptor bag to pick up dust, while the other may be used for a hose to pick up water from under benches or other not readily accessible places.

Figure 1:
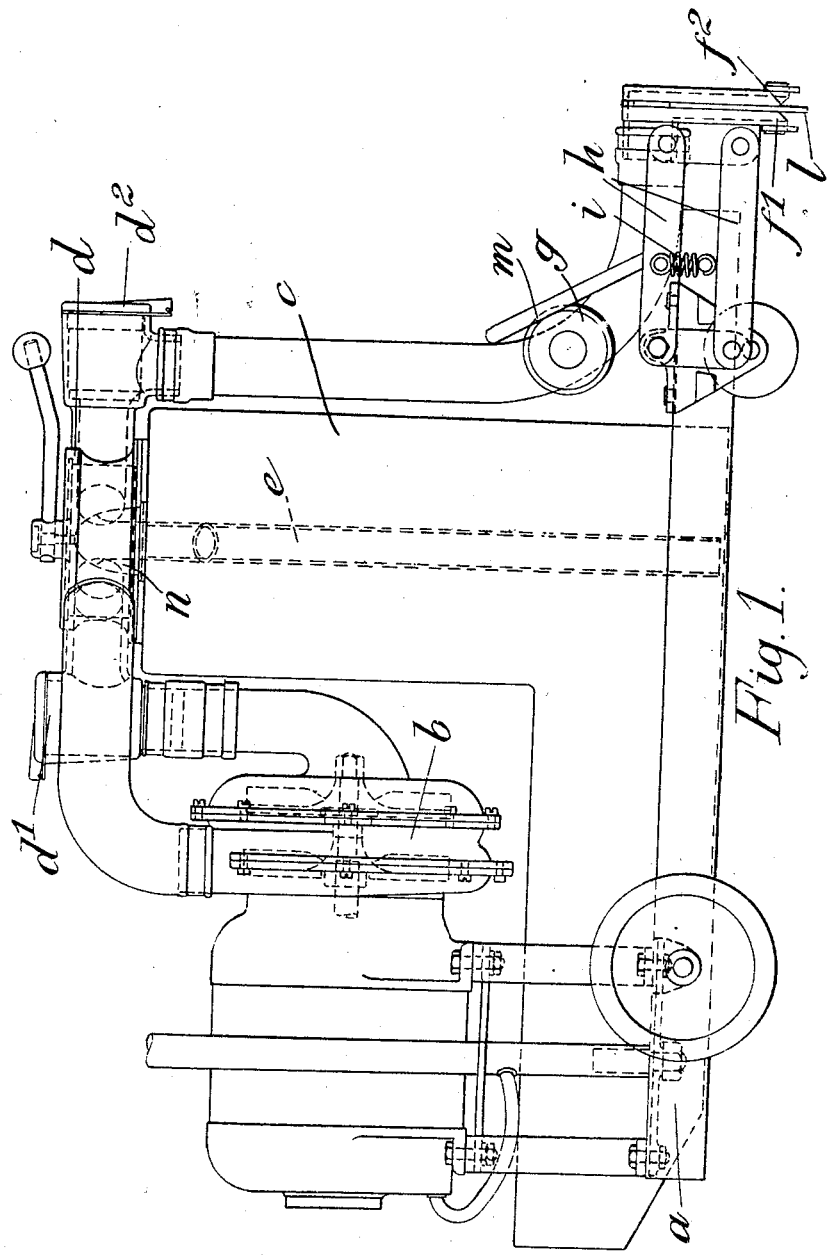
Figure 1 is a side elevation of the machine.
Figure 2:
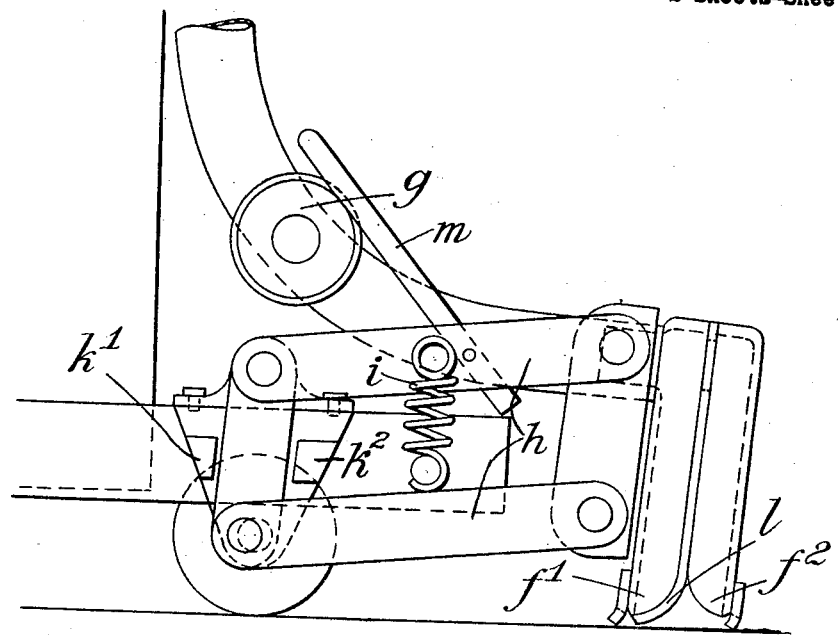
Figures 2 and 3 are two views showing the nozzle portion of the machine with the nozzles in the positions they assume according as the machine is being pushed or pulled.
Figure 3:
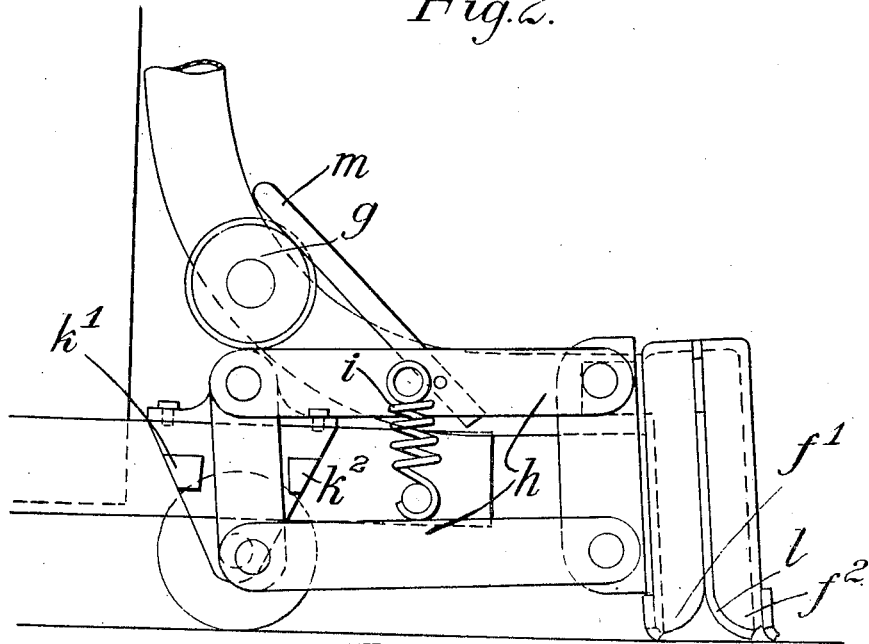

In place of having a single nozzle, however, extending transversely of the frame, I provide twin nozzles $f^1$ $f^2$ connected to the suction pipe of the pump through a suitable flexible joint $g$ and the nozzles are suspended from the frame by a parallel link motion $h$. The parallel link motion $h$ comprises a link parallelogram having an upper substantially horizontal link pivotally mounted at one end to the front and at the other end to the upper part of the nozzles, a lower substantially horizontal link and two vertical links joining the ends of the horizontal links one of which vertical links is secured to the nozzles. The parallel link motion may be controlled by a spring $i$ and which is such that one or other of the nozzles will be automatically brought nearer to the floor or other surface depending upon the direction of movement of the apparatus; for example, if the apparatus be pushed forwardly as shown in Figure 2 the forward nozzle $f^2$ will be brought nearer to the floor surface while for rearward direction as shown in Figure 3 the rear nozzle $f^1$ will be brought into operative position, there being suitable stops $k^1$ $k^2$ associated with one of the links of the parallel link motion in order to limit the movement of the latter. Furthermore in order to obviate loss of vacuum I provide means for automatically cutting out that nozzle which for the time being is not to operate depending upon the direction of movement chosen. Thus, in one convenient construction I may arrange between the nozzles a strip $l$ of rubber or other flexible material which contacts the surface to be cleaned and which will be directed forwardly across the front nozzle to cut out the latter when the machine is moved rearwardly (Figure 3), and will be directed rearwardly to cut out the rear nozzle when the machine is moving forwards (Figure 2). If necessary or desirable the whole nozzle structure may be under the control of a lever $m$ or other operative member so that it may be raised completely clear of the floor or other surface when the nozzles are not in use, or, during periods when the machine is standing idle. Thus, the lower end of lever $m$ may abut the frame $a$ when the lever is in the inclined position as shown, so that links $h$ will be lifted when the lever is thrown into the vertical, overcentre position.

It will be understood that the invention extends broadly to a two-way operative squeegee of the character referred to and the invention is therefore not to be limited to any particular construction of frame or support or the means by which the same is moved over the surface to be treated and I may vary the shape and construction of the nozzles and the means for supporting the same so that one or other nozzle may be brought into operation at one time depending upon any practical requirements that may have to be fulfilled.

I claim:

1. A suction squeegee comprising a mobile frame carrying a pump having a suction pipe and a tank into which liquid drawn up by the pump from the floor or other surface is discharged, a substantially vertical flexible strip carried by the frame to contact the surface with its lower edge, and a nozzle on each side of said flexible strip connected to the suction pipe and arranged so that on movement of the frame in one direction the sheet is flexed to cover the nozzle in rear of it while when the frame is moved in the opposite direction the sheet is flexed to cover the other nozzle.

2. A suction squeegee comprising a mobile frame carrying a pump having a suction pipe and a tank into which liquid drawn up by the pump from the floor or other surface is discharged, two rigidly connected nozzles connected to the suction pipe and located so as to have the nozzle apertures adjacent the surface, flexible strip means adapted to be flexed by contact with the surface so as to close one or other of the nozzles depending on whether the frame is moved in the forward or rearward direction, and a pivotal mounting for said nozzles whereby as the frame is moved in the forward or the rearward direction the nozzles are turned about the pivot by the contact of the flexible strip means with the surface so that the open nozzle is brought closer to the surface than the closed one.

3. A suction squeegee comprising a mobile frame carrying a pump having a suction pipe and a tank into which liquid drawn up by the pump from the floor or other surface is discharged, two substantially vertically directed rigidly connected nozzles flexibly connected to the suction pipe and located so as to have the nozzle apertures adjacent the surface, flexible strip means adapted to be flexed by contact with the surface so as to close one or other of the nozzles depending on whether the frame is moved in the forward or rearward direction, and a substantially horizontal link pivotally mounted at one end to the frame and at the other to the upper part of the nozzles whereby as the frame is moved in one direction or the other the nozzles are pivoted due to the contact of the flexible strip means with the surface so as to bring the leading nozzle closer to the surface and means for limiting the extent of pivoting of the nozzles in each direction.

4. A suction squeegee as claimed in claim 3 in which the horizontal link forms part of a link parallelogram having two substantially horizontal and two substantially vertical links, one of which vertical links is secured to said nozzles, and said means for limiting the extent of pivoting of the nozzles in each direction comprise stops provided on the frame to limit the angular movement of the other vertical link.

WILLIAM JAMES BRIDGE.

REFERENCES CITED

The following references are of record in the file of this patent:

UNITED STATES PATENTS

| Number | Name | Date |
| --- | --- | --- |
| 965,315 | Moorhead | July 26, 1910 |
| 1,079,378 | Templin | Nov. 25, 1913 |
| 1,240,799 | Gray | Sept. 18, 1917 |
| 2,274,560 | Ott | Feb. 24, 1942 |